United States Patent
Yan

(10) Patent No.: US 8,707,995 B2
(45) Date of Patent: Apr. 29, 2014

(54) CONSTANT TEMPERATURE CONTROL DEVICE

(75) Inventor: Liguo Yan, Guangdong (CN)

(73) Assignee: Globe Union Industrial Corp., Taichung (TW)

( * ) Notice: Subject to any disclaimer, the term of this patent is extended or adjusted under 35 U.S.C. 154(b) by 463 days.

(21) Appl. No.: 13/212,092

(22) Filed: Aug. 17, 2011

(65) Prior Publication Data
US 2013/0042923 A1 Feb. 21, 2013

(51) Int. Cl.
*F16K 11/074* (2006.01)

(52) U.S. Cl.
USPC .................... 137/625.4; 137/100

(58) Field of Classification Search
USPC ....................... 137/98, 100, 625.4
See application file for complete search history.

(56) References Cited

U.S. PATENT DOCUMENTS

| | | | | |
|---|---|---|---|---|
| 4,738,393 A | * | 4/1988 | Bergmann et al. | 236/12.16 |
| 5,505,225 A | * | 4/1996 | Niakan | 137/315.05 |
| 5,725,010 A | * | 3/1998 | Marty et al. | 137/100 |
| 5,732,729 A | * | 3/1998 | Shieh | 137/100 |
| 5,931,181 A | * | 8/1999 | Cook et al. | 137/100 |
| 6,263,899 B1 | * | 7/2001 | Zindler | 137/98 |
| 6,325,089 B1 | * | 12/2001 | Breda | 137/98 |
| 6,732,754 B2 | * | 5/2004 | Ottelli | 137/100 |
| 8,118,057 B2 | * | 2/2012 | Deutsch et al. | 137/625.4 |
| 8,267,111 B2 | * | 9/2012 | Yang | 137/100 |

\* cited by examiner

*Primary Examiner* — John Fox

(57) ABSTRACT

A constant temperature control device contains a base including a central wall and a peripheral wall to define a chamber; the peripheral wall including a tunnel and hooks; the central wall including a first and a second holes and two grooves; a pressure balanced valve engaged in the chamber and including a first and a second inflow orifices and a first and a second outflow orifices; a controlling assembly including an operating shaft and a stainless steel piece; two plug sets, each including two springs and two stoppers, and each stopper including an aperture; a covering member including projections and a pore; between the covering member and the disk being defined with a second cavity; an outlet member fixed in the tunnel of the base and including a twisted passageway arranged therein so that the mixed water flows vertically from the tunnel and then is guided to jet horizontally.

7 Claims, 13 Drawing Sheets

CONSTANT TEMPERATURE CONTROL DEVICE

BACKGROUND OF THE INVENTION

1. Field of the Invention

The present invention relates to a constant temperature control device with a pressure balanced valve.

2. Description of the Prior Art

Conventional constant temperature control device with a pressure balanced valve is used in a showering equipment and includes a handle to drive a lever to rotate a first ceramics member and a second ceramics member, because the first ceramics member includes an inflow room and a close wall, when the handle is in a close state, cold water and hot water flow into a first hole and a second hole of the second ceramics member respectively via the pressure balanced valve, and the cold water and the hot water are closed by the close wall without flowing outward.

When the handle is rotated, the inflow room of the first ceramics member is rotated to communicate with the first hole and the second hole of the second ceramics member so that the cold water flows into an inlet channel of a mixed room via the inflow room, the mixing room, and an orifice of the mixed room, thus having a cold water supply. With a rotation of the handle, the inflow room of the first ceramics member is in communication with the second hole of the second ceramics member so that the cold water from the first hole and the hot water from the second hole flow into the inflow room and are guided into the mixed room to be mixed together, thereafter mixed water flows out of an outlet channel to have a mixed water supply. Furthermore, after the handle is rotated increasingly, a temperature of the mixed water enhances accordingly. To prevent the temperature of the mixed water from being high overly, an adjusting mechanism is provided on the lever to limit a rotating angle of the lever.

However, a base of the constant temperature control device is retained with a covering member, when the first ceramics member and the second ceramics member are broken after being used for a period of time, the constant temperature control device can not be operated normally and has to be replaced, thereby having an inconvenient maintenance and replacement.

The lever of the constant temperature control device is comprised of a plurality of components worked in advance and then connected together, having an assembly cost.

The showering equipment includes a faucet fixed below a conventional temperature control device and a shower head disposed above the temperature control device, and the faucet includes a lever to distribute water and to be kept in a turn-on state normally so that when a handle of the temperature control device is rotated, mixed water generating by mixing cold water and hot water together flows out of the temperature control device and is guided to further flows out of the faucet, when a user pulls the lever of the faucet upward, the mixed water stops flowing out of the faucet and is guided to flow out of the shower head.

Nevertheless, such a conventional temperature control device can not guide the mixed water to flow toward the faucet, so when the showering equipment is in a water supply state of the faucet, one part of mixed water from the temperature control device flows toward the shower head still, having a water leak from the shower head.

Moreover, while the water supply is closed, the cold water and the hot water in the mixed room flow back to a first hole to flow the cold water and a second hole to flow the hot water of the mixed room to generate water hammer, thereby having a noise.

The present invention has arisen to mitigate and/or obviate the afore-described disadvantages.

SUMMARY OF THE INVENTION

The primary object of the present invention is to provide a constant temperature control device which is capable of overcoming the shortcomings of the conventional constant temperature control device.

To obtain the above objectives, a constant temperature control device provided by the present invention contains:

a base including a central wall and a peripheral wall to define a chamber with an opening facing downward; the central wall including a first hole to flow cold water communicating with the chamber and a second hole to flow hot water communicating with the chamber; the peripheral wall including a tunnel to flow mixed water which is mixed by the cold water and the hot water fixed on one side of a bottom end thereof and separated from the chamber; the peripheral wall including a plurality of hooks secured on a top end thereof; the central wall also including two grooves formed on a top end thereof to communicate with the first hole and the second hole respectively;

a pressure balanced valve engaged in the chamber of the base and including a first inflow orifice to flow the cold water inward and a second inflow orifice to flow the hot water inward symmetrically arranged on two sides of a bottom end thereof, and including a first outflow orifice to flow the cold water outward and a second outflow orifice to flow the hot water outward symmetrically disposed on two sides of a top end thereof; and the first outflow orifice and the second outflow orifice used to communicate with the first hole and the second hole of the base respectively;

a controlling assembly including an operating shaft and a stainless steel piece; the operating shaft being comprised of a rod-shaped cooper member used to form an extension and a plastic member integrally covered on a bottom end of the cooper member and applied to form a disk; the operating shaft including an input segment fixed on a top end of the extension to input a rotating force and to be rotated; the disk including a number of recesses and notches, all of which are arranged on an outer surface of the disk, the disk also including two first inlets axially formed thereon; the stainless steel piece including a plurality of pillars arranged on an outer surface thereof to engage with the recesses of the disk respectively so as to be rotated with the operating shaft, and the stainless steel piece including two second inlets axially formed on the outer surface thereof to communicate with the two first inlets of the disk individually;

two plug sets, each including two springs and two stoppers; the two springs being fixed in the two grooves of the central wall of the base individually; the two stoppers being pushed upward by the two springs respectively to engage with a bottom end of the stainless steel piece, and each stopper including an aperture to communicate with each of the two first inlets or to be closed by the stainless steel piece;

a covering member including a plurality of projections disposed on an outer surface thereof to engage with the hooks respectively and a pore fixed on a central position thereof to insert the extension of the operating shaft; and between the covering member and the disk of the operating shaft being defined with a second cavity to communicate with the two first inlets of the disk so that the cold water and the hot water flowing through the two inlets are mixed together in the second cavity and then flow into the tunnel via the notches of the disk;

an outlet member fixed in the tunnel of the base and including a twisted passageway arranged therein so that the mixed water flows vertically from the tunnel and then is guided to jet horizontally.

Thereby, when the constant temperature control device is in the normal state, the controlling assembly is controlled to be located at a close position, so the aperture of each stopper is not closed by the stainless steel piece. When the user takes a shower, the handle of the constant temperature control device is rotated to drive the stainless steel piece of the controlling assembly to rotate so that the two second inlets communicate with two aperture of the two stoppers individually so that the cold water from the first hole and the hot water from the second hole are guided into the second cavity to mix together, and then the mixed water flows out of the faucet via the notches of the disk, the tunnel of the base, the outlet member, the outlet, and the first outlet passage in turn; wherein due to the mixed water is guided to flow toward the first outlet passage to form a jetted water, the siphon action opposite to the second outlet passage generates to prevent the jetted water from flowing out of the second outlet passage, thus obtaining a leak proof purpose of the shower head.

As desiring to shift the jetted water of the faucet into a water supply of the shower head, the lever of the faucet is pulled upward to close the jetted water of the faucet, and the mixed water from the constant temperature control device is guided toward the second outlet passage by a water pressure and flows out of the shower head.

Because the base is engaged with or disengaged from the two projections and an indentation by using the two hooks and the positioning block respectively, the stainless steel piece, the springs, and the plugs are maintained and replaced easily without replacing the constant temperature control device completely to save maintenance and replacement cost.

Due to the operating shaft includes the cooper member to form the extension and the plastic member integrally covered on the bottom end of the cooper member to form the disk, a connecting cost of the cooper member and the plastic member is saved and a poor connecting problem thereof s avoided.

In addition, the first inflow orifice and the second inflow orifice of the pressure balanced valve are provided with two check valves individually so that the constant temperature control device are shifted from a water turn-on state to a water turn-off state so that the cold water and the hot water will not flow back to the first channel or the second channel from the pressure balanced valve, thereby preventing from a water hammer.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
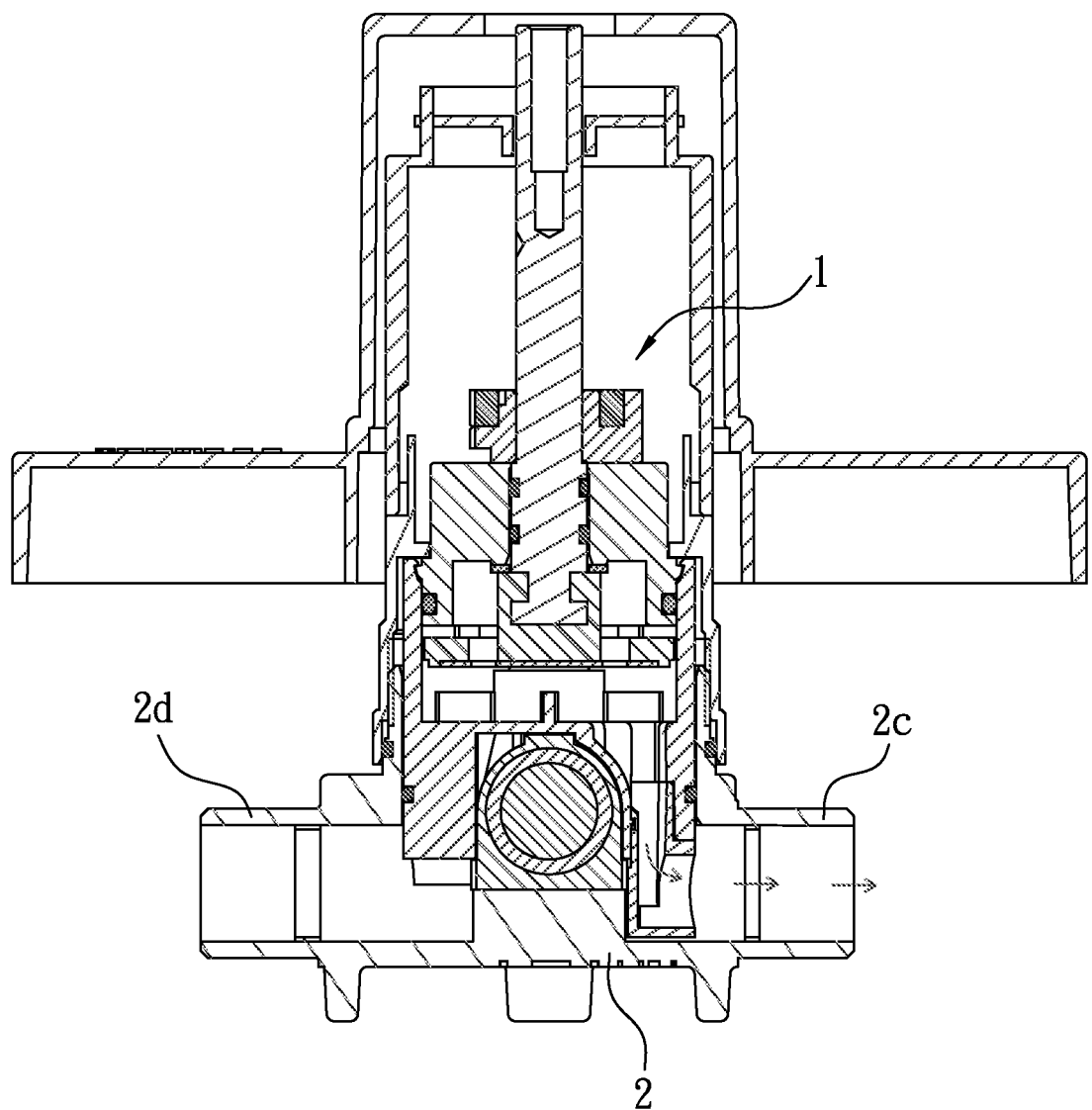
FIG. 1 is a cross sectional view showing a constant temperature control device according to a first embodiment of the present invention being used in a showering equipment.
Figure 2:
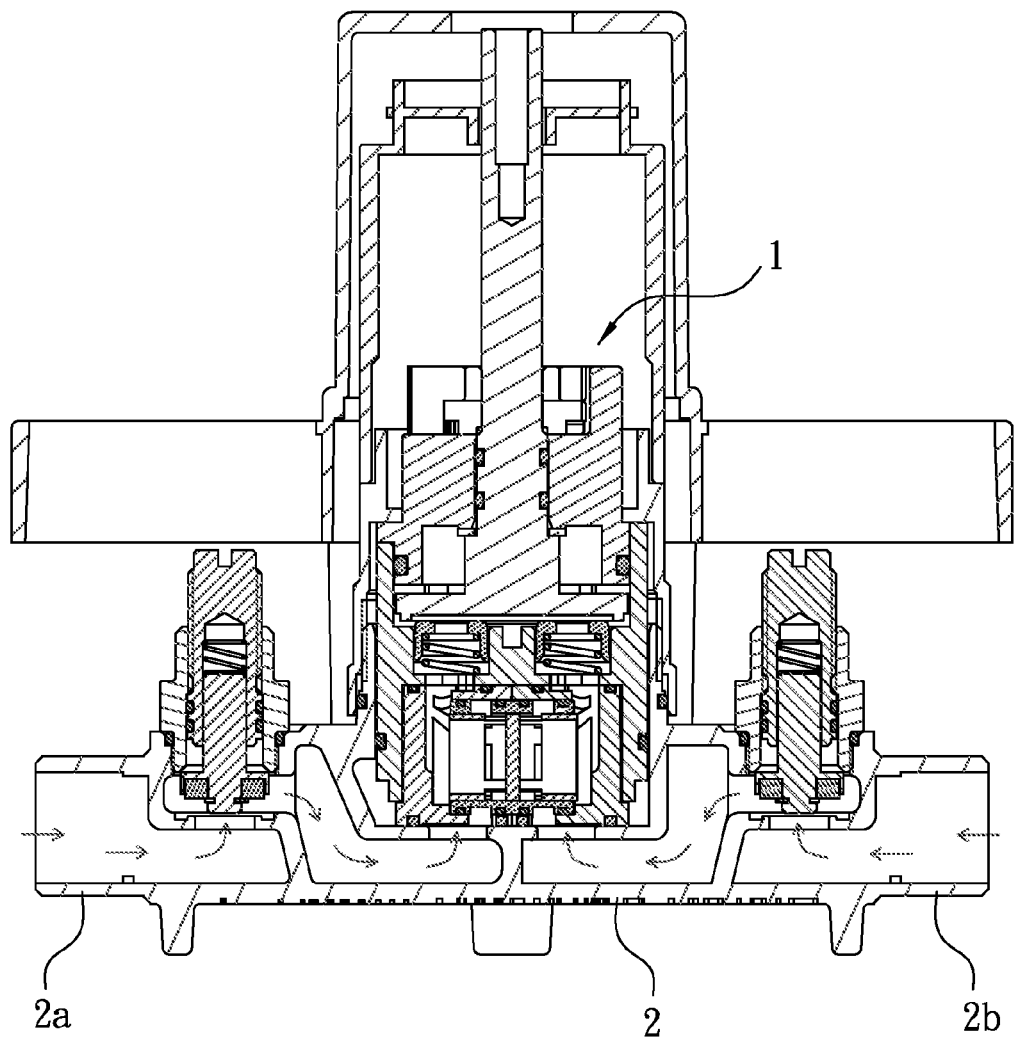
FIG. 2 is another cross sectional view showing the constant temperature control device according to the first embodiment of the present invention being used in the showering equipment.
Figure 3:
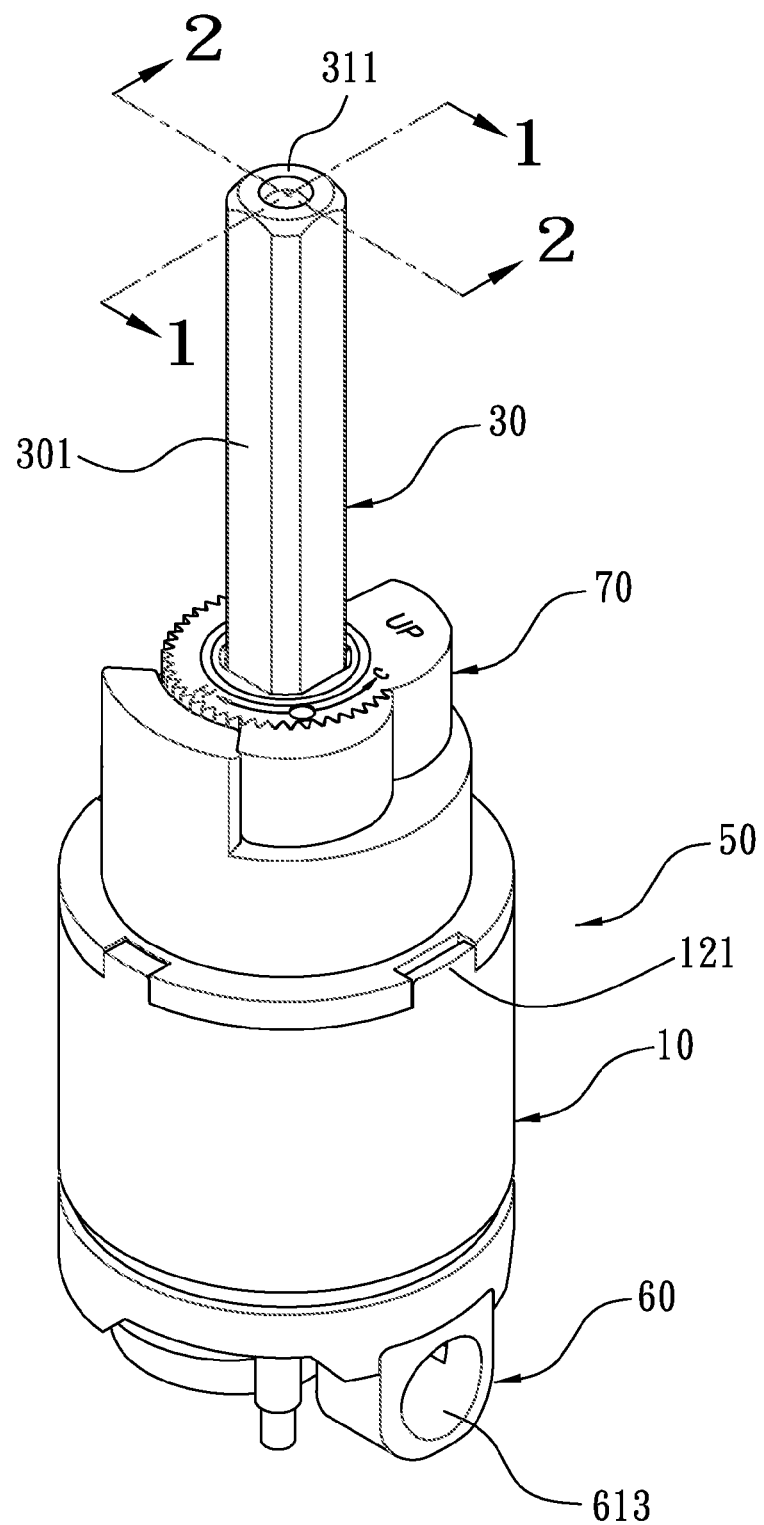
FIG. 3 is a perspective view showing the assembly of the constant temperature control device according to the first embodiment of the present invention.

Referring to FIGS. 1-3, a constant temperature control device 1 according to a first embodiment of the present invention is a pressure balance type of constant temperature control device and is fixed in a cross pipe member 2 of a showering equipment, the pipe member 2 includes a first channel 2a to flow cold water into the constant temperature control device 1 and a second channel 2b to flow hot water into the constant temperature control device 1, and the first channel 2a and the second channel 2b are spaced apart from each other, the pipe member 2 also includes a first outlet passage 2c and a second outlet passage 2d; wherein the first outlet passage 2c is connected with a faucet and includes a lever to distribute water disposed thereon so that the first outlet passage 2c is turned on in a normal state; the second outlet passage 2d is coupled with a shower head; when a user turns on a handle of the constant temperature control device 1, mixed water, which is mixed the cold water and the hot water together in the constant temperature control device 1, flows out of the faucet via the first outlet passage 2c; when the lever is pulled upward by the user, and the mixed water flows out of the shower head via the second outlet passage 2d.

Figure 4:
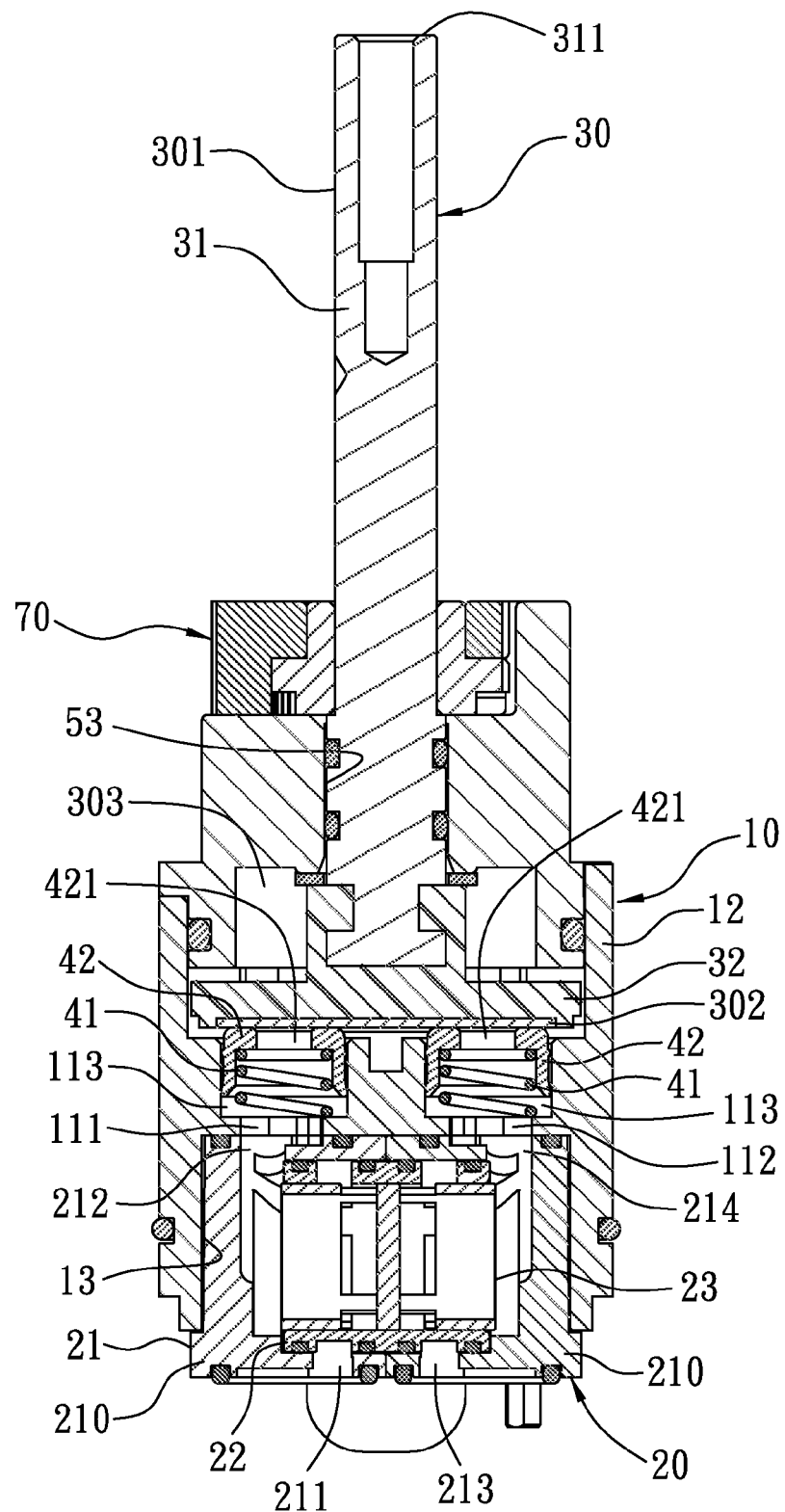
FIG. 4 is a cross sectional taken along the line 1-1 of FIG. 3.
Figure 7:
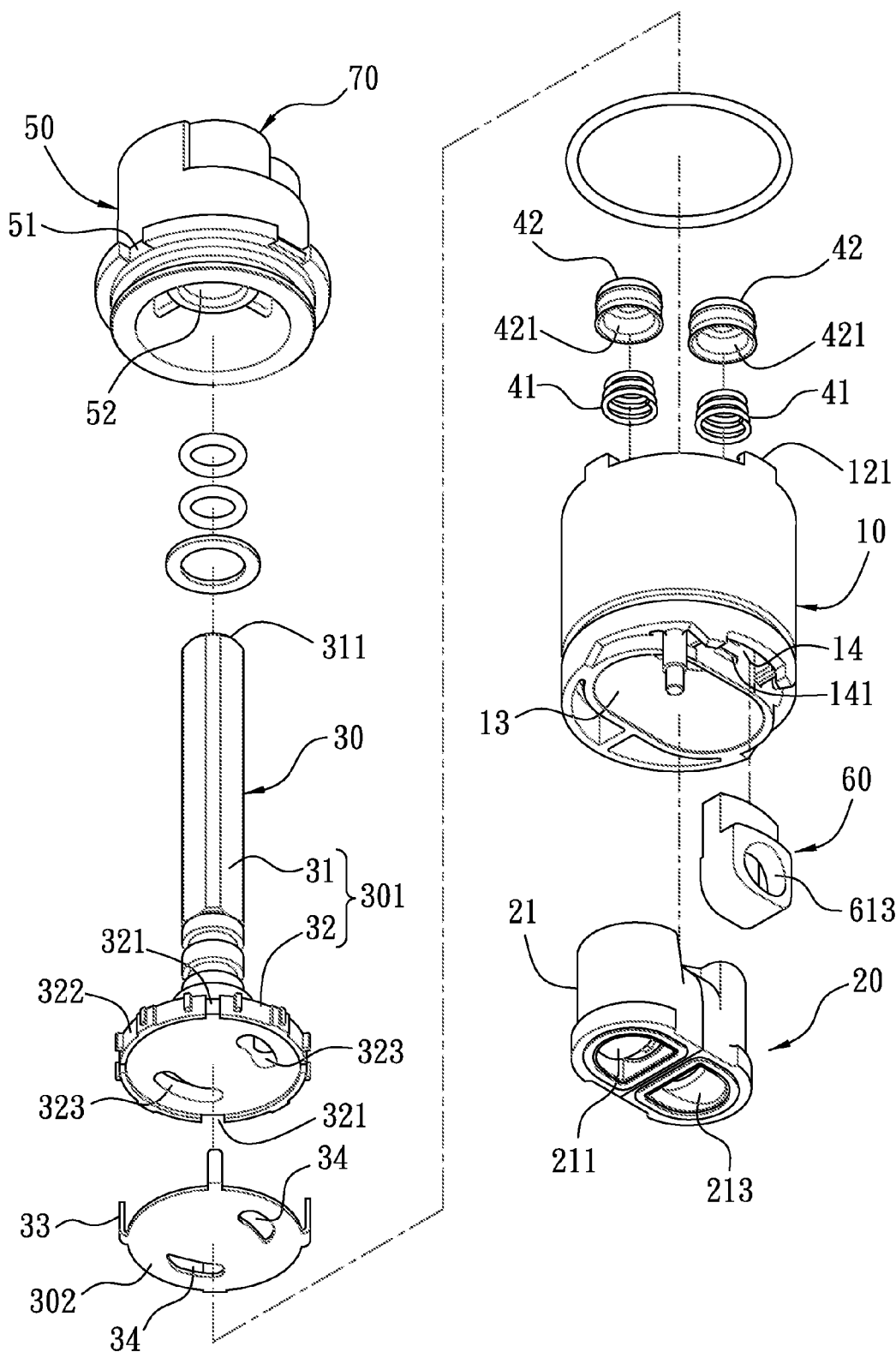
FIG. 7 is another perspective view showing the exploded components of the constant temperature control device according to the first embodiment of the present invention.

Referring to FIGS. 4 and 7, the constant temperature control device 1 comprises a base 10, a pressure balanced valve 20, a controlling assembly 30, two plug sets 40, a covering member 50, an outlet member 60, and an adjusting mechanism 70.

The base 10 includes a central wall 11 and a peripheral wall 12 to define a chamber 13 with an opening facing downward; the central wall 11 includes a first hole 111 to flow the cold water communicating with the chamber 13 and a second hole 112 to flow the hot water communicating with the chamber 13; the peripheral wall 12 includes a tunnel 14 to flow the mixed water fixed on one side of a bottom end thereof and separated from the chamber 13; the peripheral wall 12 includes two hooks 121 symmetrically secured on a top end thereof and a positioning block 122 defined between the hooks 121.

The central wall 11 of the base 10 also includes two grooves 113 formed on a top end thereof to communicate with the first hole 111 and the second hole 112 respectively.

Figure 8:
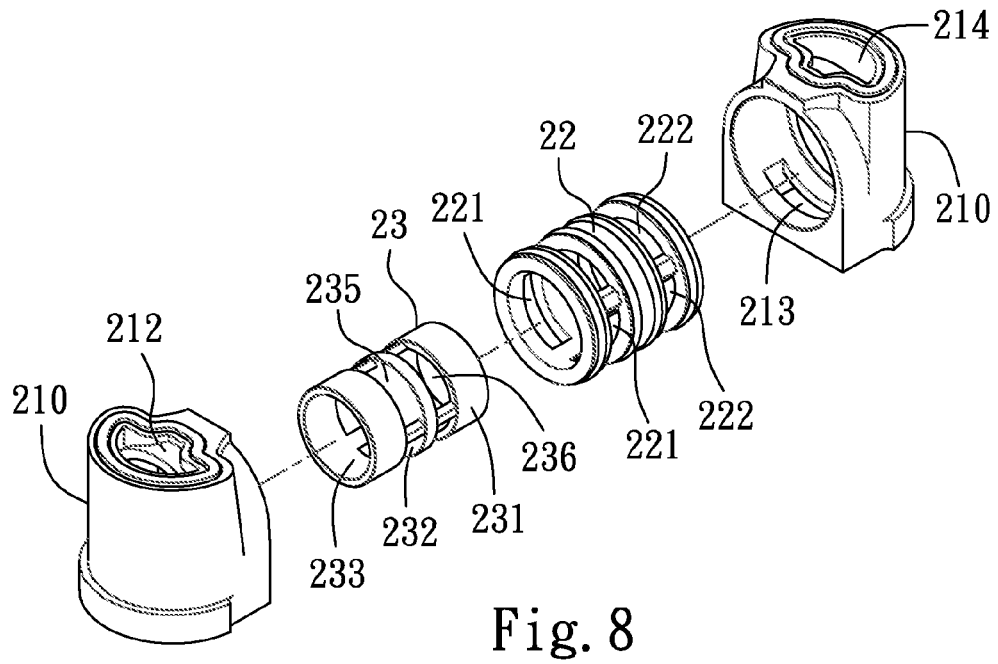
FIG. 8 is a perspective view showing the exploded components of a pressure balanced valve of the constant temperature control device according to the first embodiment of the present invention.
Figure 9:
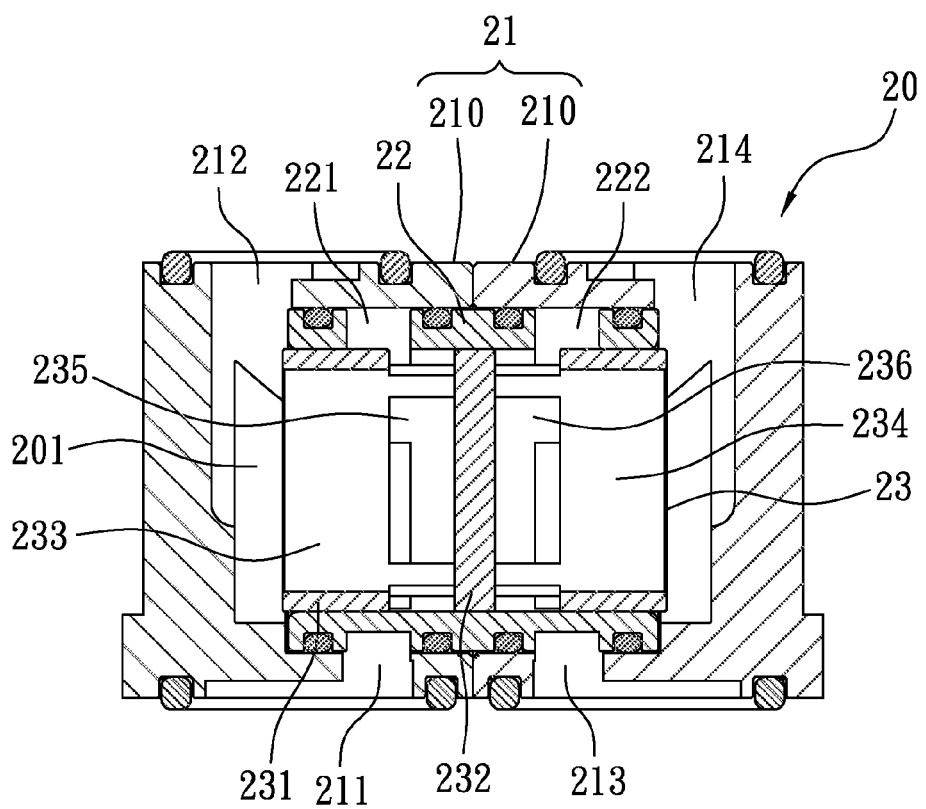
FIG. 9 is a cross sectional view showing the assembly of the pressure balanced valve of the constant temperature control device according to the first embodiment of the present invention.

The pressure balanced valve 20, as shown in FIGS. 8 and 9, is engaged in the chamber 13 of the base 10 and includes a seat 21, a casing 22 fixed in the seat 21, and a valve core 23 axially sliding in the casing 22.

The seat 21 includes two symmetrical lids 210 capable of being spaced apart from each other and abutting against with each other and a first cavity 201 formed as the two lids 210 abut against each other, one of the two lids 210 includes a first inflow orifice 211 to flow the cold water inward arranged on a bottom end thereof and a first outflow orifice 212 to flow the cold water outward disposed on a top end thereof, and another of the two lids 210 includes a second inflow orifice 213 to flow the hot water inward arranged on a bottom end thereof and a second outflow orifice 214 to flow the hot water outward disposed on a top end thereof, and the first outflow orifice 212 and the second outflow orifice 214 communicate with the first hole 111 and the second hole 112 of the base 10 respectively.

The casing 22 is limited in the first cavity 201 of the seat 21 and includes a plurality of first slots 221 to flow the cold water communicating with the first inflow orifice 211 and a number of second slots 222 to flow the hot water communicating with the second inflow orifice 213.

The valve core 23 to axially slide in the casing 22 is formed in a sleeve shape and includes a peripheral face 231 and a sensing face 232 connecting with a central section of the peripheral face 231 so that the peripheral face 231 on two sides of the sensing face 232 is defined with a cold-water pressure room 233 and a hot-water pressure room 234, and the cold-water pressure room 233 includes a plurality of third slots 235 to flow the cold water arranged thereon in relation to the peripheral face 231 and communicating with the first slots 221 individually, the hot-water pressure room 234 includes a number of fourth slots 236 to flow the hot water arranged thereon relative to the peripheral face 231 and communicating the second slots 222 respectively. When the cold water flowing into the cold-water pressure room 233 and the hot water flowing into the hot-water pressure room 234 generate a pressure difference, the valve core 23 slides and adjusts automatically, wherein when a first cross-sectional area which is formed as the first slots 221 and the third slots 235 overlap together and a second cross-sectional area which is formed as the second slots 222 and the fourth slots 236 overlap together change, a flow quantity changes accordingly to obtain a pressure balance. Because such a pressure balanced structure is a well-known art, further remarks are omitted.

The controlling assembly 30 includes an operating shaft 301 and a stainless steel piece 302, as illustrated in FIGS. 4-7.

The operating shaft 301 includes an extension 31 and a disk 32 disposed on a bottom end of the extension 31; the operating shaft 301 includes an input segment 311 fixed on a top end of the extension 31 to input a rotating force and rotated by a grip fitted with the extension 31; the disk 32 includes a number of recesses 321 and notches 322, all of which are arranged on an outer surface of the disk 32, the disk 32 also includes two first inlets 323 axially formed thereon; wherein there are four recesses 321 equiangularly provided on the disk 32 in this embodiment.

The operating shaft 301 is comprised of a rod-shaped cooper member and a plastic member integrally covered on a bottom end of the cooper member, the cooper member is used to form the extension 31 and the plastic member is applied to form the disk 32.

The stainless steel piece 302 includes a plurality of pillars 33 arranged on an outer surface thereof, wherein there are four pillars 33 equiangularly provided on the stainless steel piece 302 in this embodiment to engage with the recesses 321 of the disk 32 respectively so as to be rotated with the operating shaft 301, and the stainless steel piece 302 includes two second inlets 34 axially formed on an outer surface thereof to communicate with the two first inlets 323 of the disk 32 individually.

Figure 10:
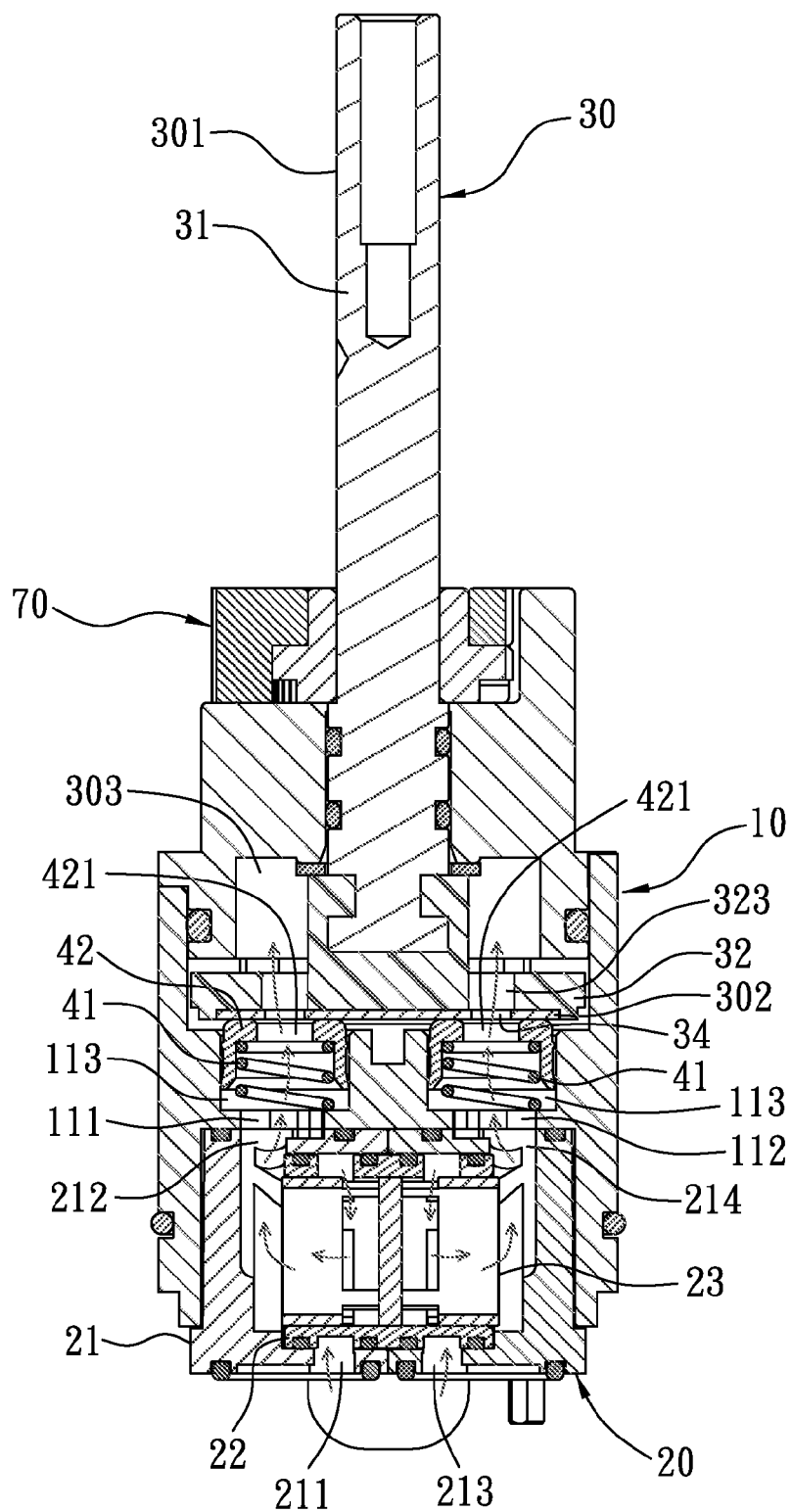
FIG. 10 is another cross sectional taken along the line 1-1 of FIG. 3.

Each of the two plug sets 40 include two springs 41 and two stoppers 42 respectively; the two springs 41 are fixed in the two grooves 113 of the central wall 11 of the base 10 individually; the two stoppers 42 are pushed upward by the two springs 41 respectively to engage with a bottom end of the stainless steel piece 302, and each stopper 42 includes an aperture 421 to completely or partially communicate with each of the two first inlets 323 with a rotation of the controlling assembly 30 as shown in FIG. 10 so that the cold water from the first hole 111 and the hot water from the second hole 112 flow into the two second inlets 34 of the stainless steel piece 302 and the two first inlets 323 of the operating shaft 301 via the aperture 421 individually or are closed by the stainless steel piece 302 as illustrated in FIG. 4.

The covering member 50 includes two projections 51 symmetrically disposed on an outer surface thereof and an indentation 52 defined between the two projections 51; the two projections 51 are served to engage with the two hooks 121 respectively; the indentation 52 is provided to engage with the positioning block 122; the covering member 50 also includes a pore 53 fixed on a central position thereof to insert the extension 31 of the operating shaft 301, and between the covering member 50 and the disk 32 of the operating shaft 301 is defined with a second cavity 303 to communicate with the two first inlets 323 of the disk 32 so that the cold water and the hot water flowing through the two inlets 323 are mixed together in the second cavity 303 to form the mixed water, and then the mixed water flows into the tunnel 14 via the notches 322 of the disk 32 as shown in FIG. 10.

Figure 5:
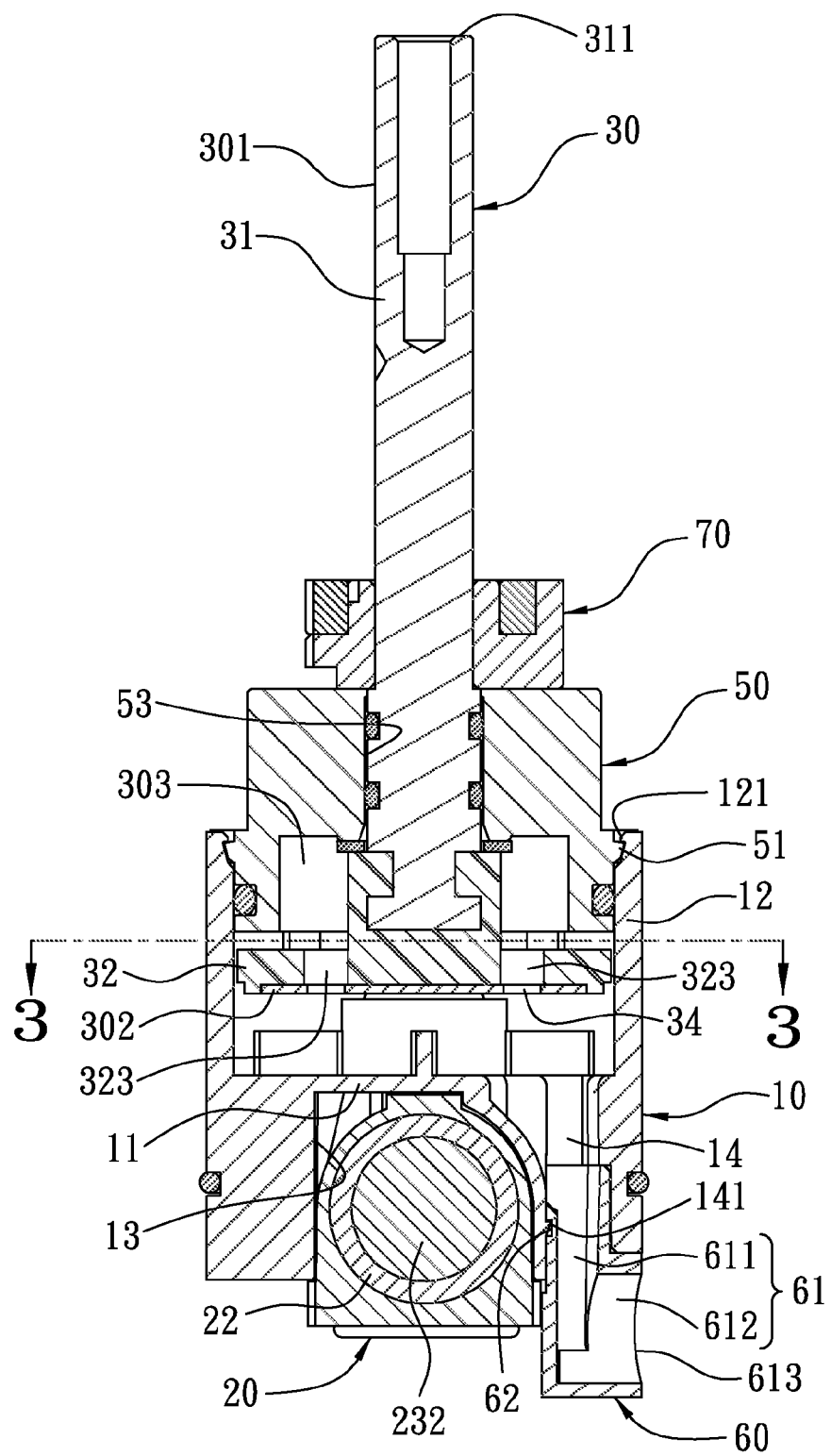
FIG. 5 is a cross sectional taken along the line 2-2 of FIG. 3.
Figure 6:
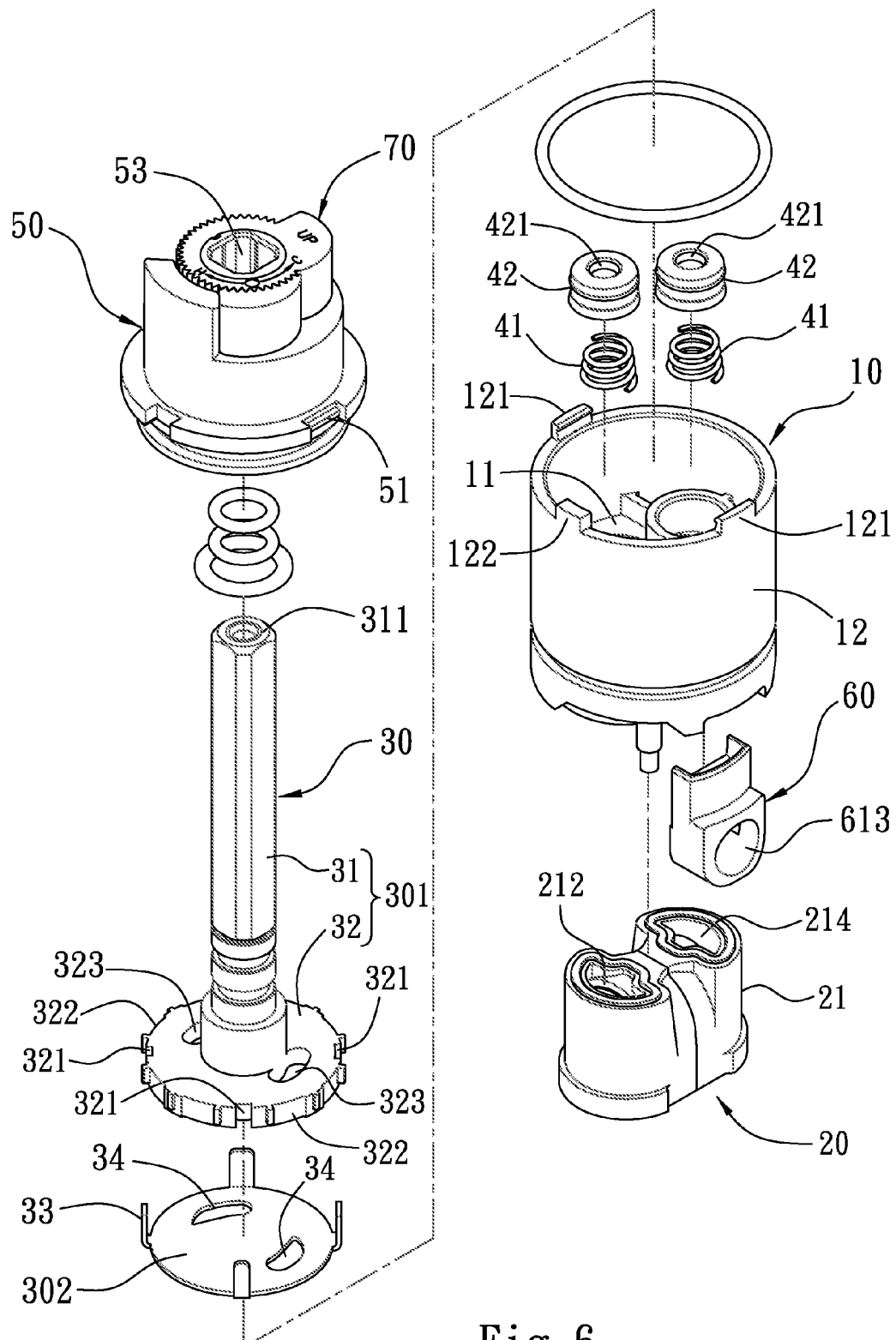
FIG. 6 is a perspective view showing the exploded components of the constant temperature control device according to the first embodiment of the present invention.
Figure 12:
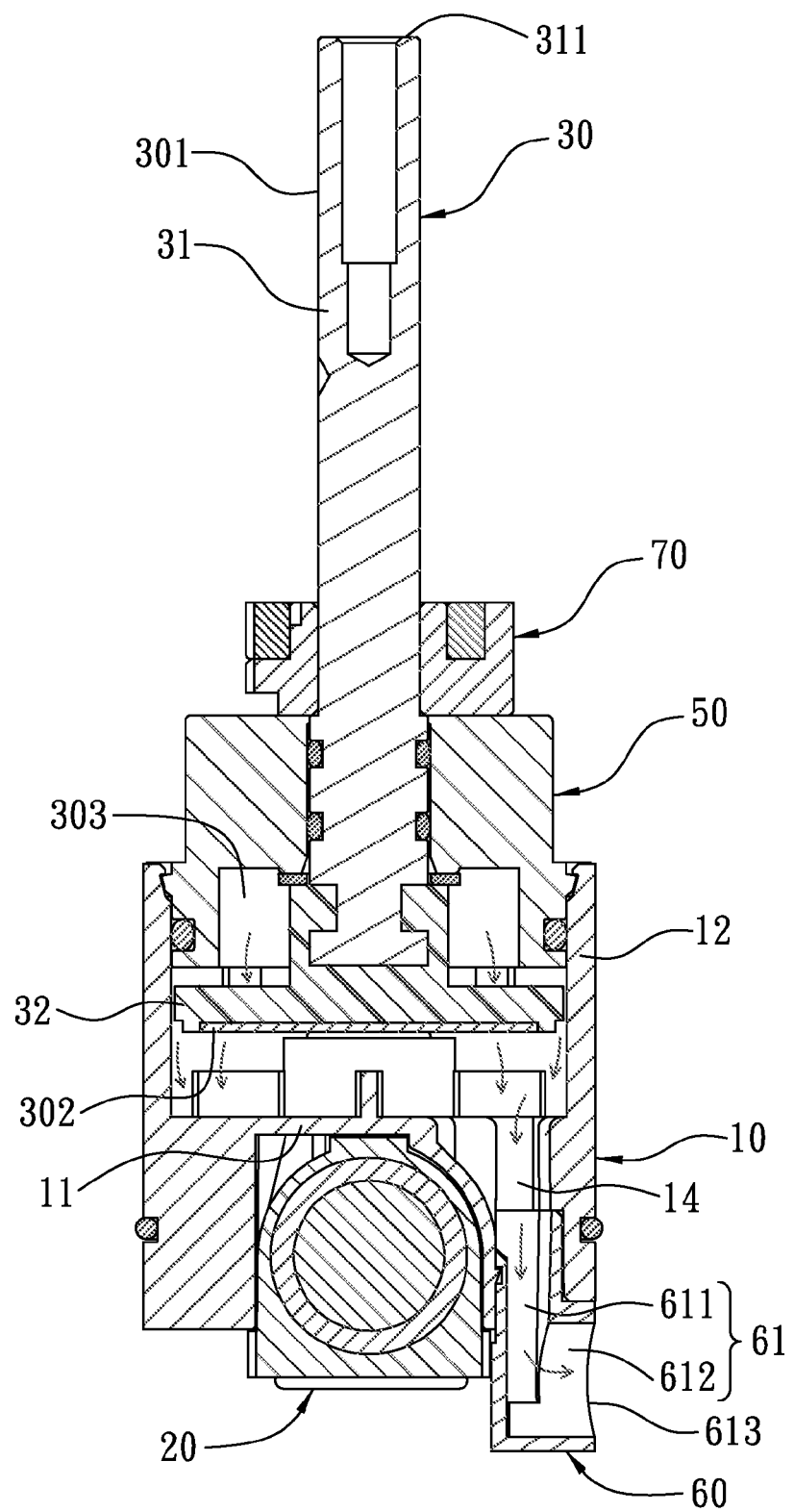
FIG. 12 is another cross sectional taken along the line 2-2 of FIG. 3.

The outlet member 60 is fixed in the tunnel 14 of the base 10 and includes a twisted passageway 61 arranged therein so that the mixed water flows vertically from the tunnel 14 and then is guided to jet horizontally as illustrated in FIGS. 5 and 12.

The twisted passageway 61 includes a vertical section 611 and a horizontal section 612, both of which are in communication with each other and form a 90 degree angle, and the horizontal section 612 includes an outlet 613 arranged on a distal end thereof and facing to the first outlet passage 2c so that the mixed water flowing vertically from the tunnel 14 is guided to flow in a horizontal direction and then to jet toward the first outlet passage 2c, thus generating a siphon action as shown in FIG. 1.

An outer surface of the outlet member 60 is formed to match with the tunnel 14 so as to be engaged in the tunnel 14 and includes a cutout 62 disposed thereon to engage with a locking protrusion 141 of the tunnel 14 as illustrated in FIGS. 5 and 7.

The adjusting mechanism 70 is fixed on a top end of the covering member 50 and fitted with the extension 31 of the operating shaft 301 so as to adjust a rotating angle of the operating shaft 301; since the adjusting mechanism 70 is a well-known art, further remarks are omitted.

Figure 11:
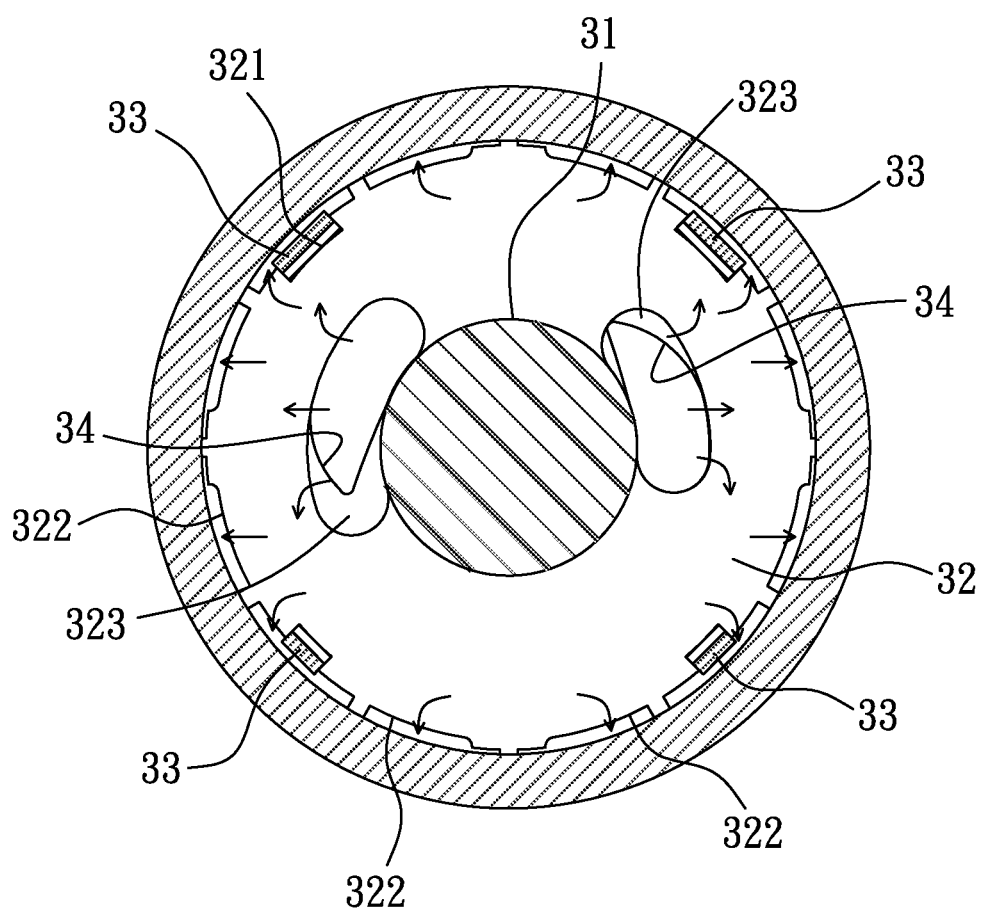
FIG. 11 is a cross sectional taken along the line 3-3 of FIG. 5.

When the constant temperature control device 1 is in the normal state, the controlling assembly 30 is controlled to be located at a close position, so the aperture 421 of each stopper 42 is not closed by the stainless steel piece 302 as illustrated in FIGS. 4 and 5. When the user takes a shower, the handle of the constant temperature control device 1 is rotated to drive the stainless steel piece 302 of the controlling assembly 30 to rotate so that the two second inlets 34 communicate with two aperture 421 of the two stoppers 42 individually as shown in FIGS. 10-12 so that the cold water from the first hole 111 and the hot water from the second hole 112 are guided into the second cavity 303 to mix together, and then the mixed water flows out of the faucet via the notches 322 of the disk 32, the tunnel 14 of the base 10, the outlet member 60, the outlet 613, and the first outlet passage 2c in turn; wherein due to the mixed water is guided to flow toward the first outlet passage 2c to form a jetted water, the siphon action opposite to the second outlet passage 2d generates as shown in FIG. 1 to prevent the jetted water from flowing out of the second outlet passage 2d, thus obtaining a leak proof purpose of the shower head.

As desiring to shift the jetted water of the faucet into a water supply of the shower head, the lever of the faucet is pulled upward to close the jetted water of the faucet, and the mixed water from the constant temperature control device 1 is guided toward the second outlet passage 2d by a water pressure and flows out of the shower head.

Because the base 10 is engaged with or disengaged from the two projections 51 and an indentation 52 by using the two hooks 121 and the positioning block 122 respectively, the stainless steel piece 302, the springs 41, and the stoppers 42 are maintained and replaced easily without replacing the constant temperature control device 1 completely to save maintenance and replacement cost.

Due to the operating shaft 301 includes the cooper member to form the extension 31 and the plastic member integrally covered on the bottom end of the cooper member to form the disk 32, a connecting cost of the cooper member and the plastic member is saved and a poor connecting problem thereof s avoided.

Figure 13:
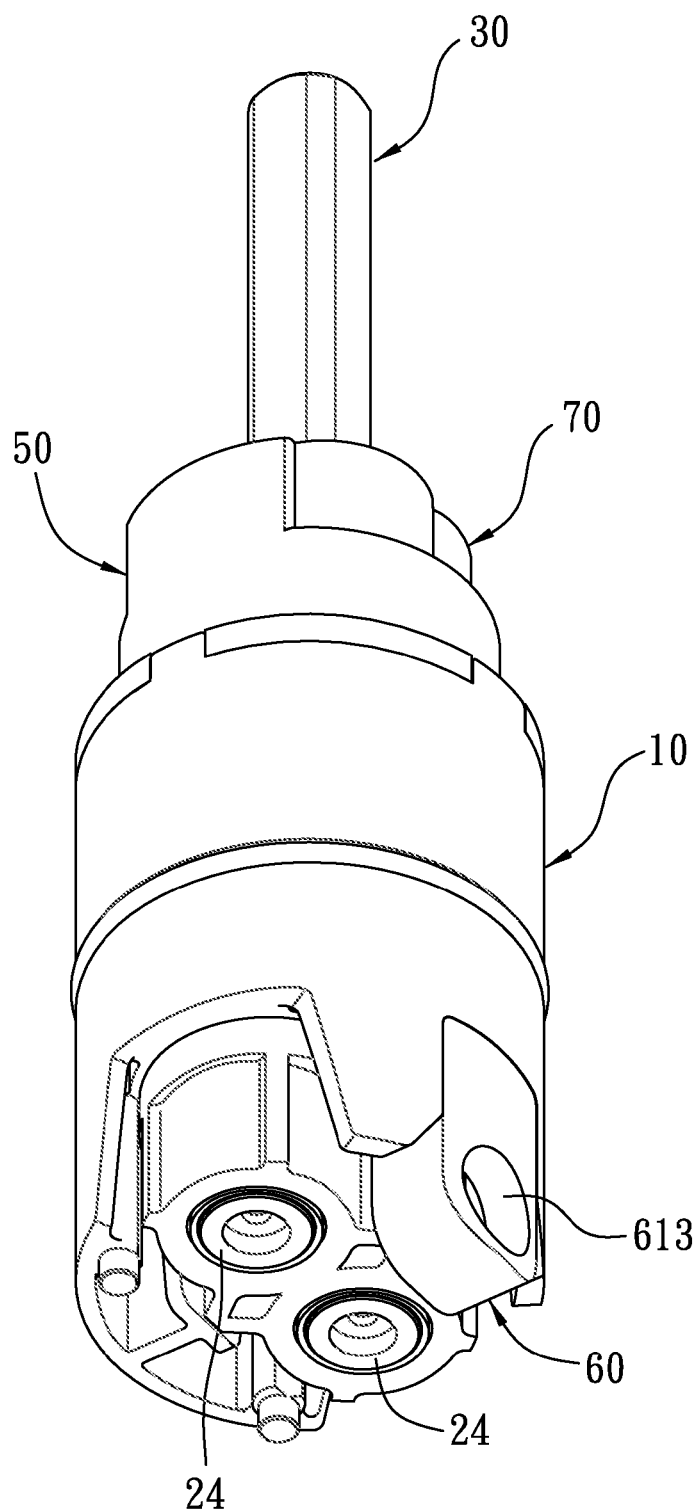
FIG. 13 is a perspective view showing the assembly of a constant temperature control device according to a second embodiment of the present invention.
Figure 14:
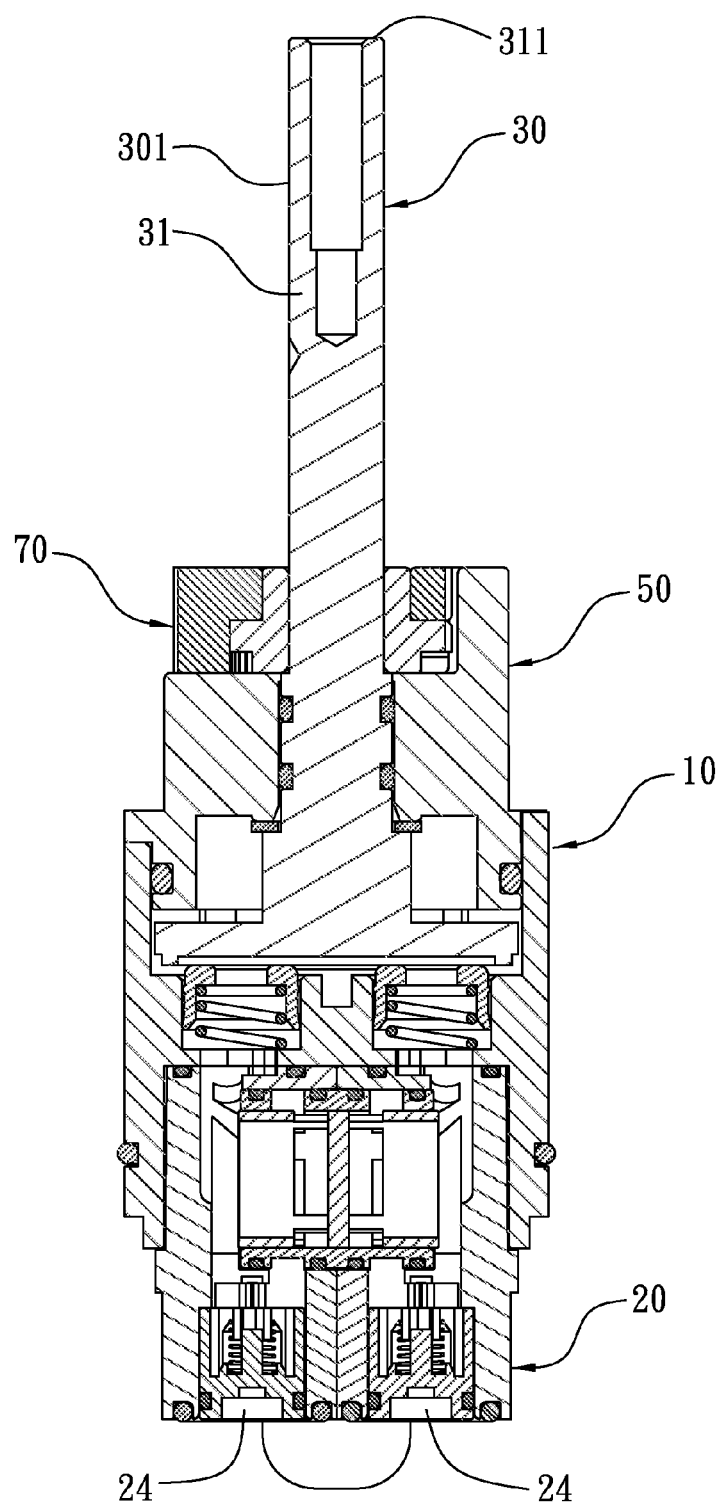
FIG. 14 is a cross sectional view showing the assembly of the constant temperature control device according to the second embodiment of the present invention.

With reference to FIGS. 13 and 14, the first inflow orifice 211 and the second inflow orifice 213 of the pressure balanced valve 20 are provided with two check valves 24 individually so that the constant temperature control device 1 are shifted from a water turn-on state to a water turn-off state so that the cold water and the hot water will not flow back to the first channel 2a or the second channel 2b from the pressure balanced valve 20, thereby preventing from a water hammer.

While we have shown and described various embodiments in accordance with the present invention, it is clear to those skilled in the art that further embodiments may be made without departing from the scope of the present invention.

What is claimed is:

1. A constant temperature control device comprising
    a base including a central wall and a peripheral wall to define a chamber with an opening facing downward; the central wall including a first hole to flow cold water communicating with the chamber and a second hole to flow hot water communicating with the chamber; the peripheral wall including a tunnel to flow mixed water which is mixed by the cold water and the hot water fixed on one side of a bottom end thereof and separated from the chamber; the peripheral wall including a plurality of hooks secured on a top end thereof; the central wall also including two grooves formed on a top end thereof to communicate with the first hole and the second hole respectively;
    a pressure balanced valve engaged in the chamber of the base and including a first inflow orifice to flow the cold water inward and a second inflow orifice to flow the hot water inward symmetrically arranged on two sides of a bottom end thereof, and including a first outflow orifice to flow the cold water outward and a second outflow orifice to flow the hot water outward symmetrically disposed on two sides of a top end thereof; and the first outflow orifice and the second outflow orifice used to communicate with the first hole and the second hole of the base respectively;
    a controlling assembly including an operating shaft and a stainless steel piece; the operating shaft being comprised of a rod-shaped cooper member used to form an extension and a plastic member integrally covered on a bottom end of the cooper member and applied to form a disk; the operating shaft including an input segment fixed on a top end of the extension to input a rotating force and to be rotated; the disk including a number of recesses and notches, all of which are arranged on an outer surface of the disk, the disk also including two first inlets axially formed thereon; the stainless steel piece including a plurality of pillars arranged on an outer surface thereof to engage with the recesses of the disk respectively so as to be rotated with the operating shaft, and the stainless steel piece including two second inlets axially formed on the outer surface thereof to communicate with the two first inlets of the disk individually;
    two plug sets, each including two springs and two stoppers; the two springs being fixed in the two grooves of the central wall of the base individually; the two stoppers being pushed upward by the two springs respectively to engage with a bottom end of the stainless steel piece, and each stopper including an aperture to communicate with each of the two first inlets or to be closed by the stainless steel piece;
    a covering member including a plurality of projections disposed on an outer surface thereof to engage with the hooks respectively and a pore fixed on a central position thereof to insert the extension of the operating shaft; and between the covering member and the disk of the operating shaft being defined with a second cavity to communicate with the two first inlets of the disk so that the cold water and the hot water flowing through the two inlets are mixed together in the second cavity and then flow into the tunnel via the notches of the disk;
    an outlet member fixed in the tunnel of the base and including a twisted passageway arranged therein so that the mixed water flows vertically from the tunnel and then is guided to jet horizontally.

2. The constant temperature control device as claimed in claim 1, wherein the first inflow orifice and the second inflow orifice of the pressure balanced valve are provided with two check valves individually.

3. The constant temperature control device as claimed in claim 1, wherein an outer surface of the outlet member is formed to match with the tunnel so as to be engaged in the tunnel and includes a cutout thereon to engage with a locking protrusion of the tunnel.

4. The constant temperature control device as claimed in claim 1, wherein the pressure balanced valve includes a seat, a casing fixed in the seat, and a valve core axially sliding in the casing; the first inflow orifice and the second inflow orifice are arranged on two sides of a bottom end of the seat, and the first outflow orifice and the second outflow orifice are disposed on two sides of a top end of the seat.

5. The constant temperature control device as claimed in claim 4, wherein the seat includes two symmetrical lids capable of being spaced apart from each other and abutting against with each other and a first cavity formed as the two lids abut against each other to limit the casing, one of the two lids includes the first inflow orifice arranged on a bottom end thereof and the first outflow orifice disposed on a top end thereof, and another of the two lids includes the second inflow orifice arranged on a bottom end thereof and a second outflow orifice disposed on a top end thereof.

6. The constant temperature control device as claimed in claim 1 further comprising an adjusting mechanism fixed on a top end of the covering member and fitted with the extension of the operating shaft so as to adjust a rotating angle of the operating shaft.

7. The constant temperature control device as claimed in claim 1, wherein the base includes a positioning block defined on a top end thereof; the covering member includes an indentation defined on an outer surface thereof to engage with the positioning block of the base.

* * * * *